(12) United States Patent
Bisset et al.

(10) Patent No.: US 8,035,863 B2
(45) Date of Patent: Oct. 11, 2011

(54) MULTIPASS IMAGE SCANS FOR INCREASED MEASUREMENT RESOLUTION DURING CALIBRATION ROUTINES

(75) Inventors: Douglas Bisset, Stevenage (GB); Michael J. Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 598 days.

(21) Appl. No.: 12/185,296

(22) Filed: Aug. 4, 2008

(65) Prior Publication Data
US 2010/0027078 A1 Feb. 4, 2010

(51) Int. Cl.
*H04N 1/00* (2006.01)
(52) U.S. Cl. ............ 358/406; 358/504; 358/505; 399/72
(58) Field of Classification Search .................. 358/406, 358/504, 1.9, 3.01, 505, 401, 518; 399/72
See application file for complete search history.

(56) References Cited

U.S. PATENT DOCUMENTS

| | | | | |
|---|---|---|---|---|
| 4,575,124 A * | 3/1986 | Morrison | ....................... | 283/115 |
| 5,060,013 A * | 10/1991 | Spence | ............................ | 399/72 |
| 6,008,907 A * | 12/1999 | Vigneau et al. | ................ | 358/1.9 |
| 6,141,120 A * | 10/2000 | Falk | .............................. | 358/504 |
| 6,204,873 B1 * | 3/2001 | Shimazaki | ..................... | 358/518 |
| 6,268,932 B1 * | 7/2001 | Lee et al. | ....................... | 358/1.9 |
| 6,327,047 B1 * | 12/2001 | Motamed | ..................... | 358/1.15 |
| 6,366,306 B1 * | 4/2002 | Fukuda | ......................... | 347/172 |
| 6,575,095 B1 * | 6/2003 | Mahy et al. | .................... | 101/485 |
| 6,658,164 B1 * | 12/2003 | Irving et al. | ................... | 382/274 |
| 6,804,027 B2 * | 10/2004 | Lee et al. | ......................... | 358/1.9 |
| 7,212,312 B2 * | 5/2007 | Motamed | ........................ | 358/1.9 |
| 7,433,064 B2 * | 10/2008 | Takahashi | ........................ | 358/1.9 |
| 2002/0033966 A1 * | 3/2002 | Lee et al. | ...................... | 358/3.01 |
| 2002/0054384 A1 * | 5/2002 | Motamed | ...................... | 358/504 |
| 2004/0046820 A1 * | 3/2004 | Wu et al. | .......................... | 347/19 |
| 2005/0219625 A1 * | 10/2005 | Koifman et al. | ............... | 358/406 |
| 2006/0139705 A1 * | 6/2006 | Piatt et al. | ...................... | 358/504 |
| 2007/0024657 A1 * | 2/2007 | Zhang et al. | .................... | 347/19 |
| 2007/0097405 A1 * | 5/2007 | Takahashi | ....................... | 358/3.1 |
| 2008/0100658 A1 * | 5/2008 | Bastani | ............................ | 347/16 |
| 2009/0153912 A1 * | 6/2009 | Ahmed et al. | .................. | 358/406 |
| 2010/0027078 A1 * | 2/2010 | Bisset et al. | .................. | 358/406 |
| 2010/0156921 A1 * | 6/2010 | McLennan et al. | ........... | 345/589 |

* cited by examiner

*Primary Examiner* — Kimberly A Williams
(74) *Attorney, Agent, or Firm* — Fay Sharpe LLP

(57) ABSTRACT

Systems and methods are described that facilitate calibrating a print engine using calibration data sets generated at at least two different L* levels to provide additional calibration measurement resolution toward the darker end of the grayscale spectrum. For instance a first, light grey (e.g., 70-90L*) calibration strip is scanned at a first resolution (e.g., 70-90L*) to generate a first calibration data set, and a second darker grey (e.g., 30-50L*) calibration strip is scanned at high resolution (e.g., 100L*) to generate a second calibration data set. The first calibration data set is used to calibrate the print engine for high L* values (e.g., 50-100) and the second calibration data set is used to calibrate the print engine for low L* values (e.g., 0-50). Alternatively, a single calibration strip having a known L* value can be scanned once at the known L* value and again at a higher L* value (e.g., 100L*) to generate two calibration data sets, which are used to improve calibration resolution in the darker part of the spectrum.

17 Claims, 4 Drawing Sheets

MULTIPASS IMAGE SCANS FOR INCREASED MEASUREMENT RESOLUTION DURING CALIBRATION ROUTINES

BACKGROUND

The subject application relates to grey level calibration in a printing system. While the systems and methods described herein relate to grey level calibration, it will be appreciated that the described techniques may find application in other printing systems, other xerographic applications, and/or other scanning systems.

When calibrating print engine grey levels, a scanner illuminates a document and generates a photon count for the document (e.g., in reflection mode). Dark areas in the document have low or no $L^*$ values, which makes print engine calibration difficult at darker grey levels. Thus, when using a scanner as a measurement device in this manner, it is difficult to obtain good black/dark grey level information because of the low availability of measurable image bits in the dark end of the spectrum.

Marking device image calibration is often performed using an image quality analysis (IQA) routine, where a scanner is used to take two measurements from a printed page: the greyscale values of light and dark grey patches. Due to natural scanner properties, the measurement resolution of the dark grey patch is relatively poor (e.g., for an 8-bit scanner or the like).

Digitizing scanner data to a higher level of accuracy requires substantial increases in processing power and analog-to-digital converters, which is undesirably expensive and labor-intensive.

Accordingly, there is an unmet need for systems and/or methods that facilitate measuring grey levels at the low end of the spectrum for calibrating print engines and the like while overcoming the aforementioned deficiencies.

BRIEF DESCRIPTION

In accordance with various aspects described herein, systems and methods are described that facilitate calibrating a print engine using dual calibration measurements that relocate grey levels to a lower (e.g., darker) end of the spectrum. For example, a method of calibrating a print engine comprises scanning a first grey calibration strip to generate a first calibration data set, scanning a second grey calibration strip to generate a second calibration data set, and calibrating the print engine using the first and second calibration data sets to calibrate different portions of an $L^*$ grey spectrum.

According to another feature described herein, a print engine calibration system comprises a scanner that scans a calibration strip at first and second target $L^*$ values, and a memory that stores computer-executable instructions for scanning the calibration strip at the first and second target $L^*$ values, generating first and second calibration data sets, and calibrating the print engine using the first and second calibration data sets. The system further comprises a processor that executes the instructions, generates the first and second calibration data sets, stores the first and second calibration sets to the memory, and calibrates the print engine using the first and second calibration data sets.

Yet another feature relates to a method of calibrating a print engine, comprising performing a first scan of a grey calibration strip at a first target value to generate a first calibration data set, performing a second scan of the grey calibration strip at a second target value to generate a second calibration data set, and calibrating the print engine using the first and second calibration data sets to calibrate different portions of an $L^*$ grey spectrum.

DETAILED DESCRIPTION

In accordance with various features described herein, systems and methods are described that facilitate extending print calibration routines by increasing calibration measurement accuracy and reducing cost by eliminating unnecessary iterations of calibration routines. Such systems and methods are applicable to any mono- or color scanner-based calibration applications, and furthermore to any applications in which it is desirable to increase detail in dark areas of a document.

Figure 1:
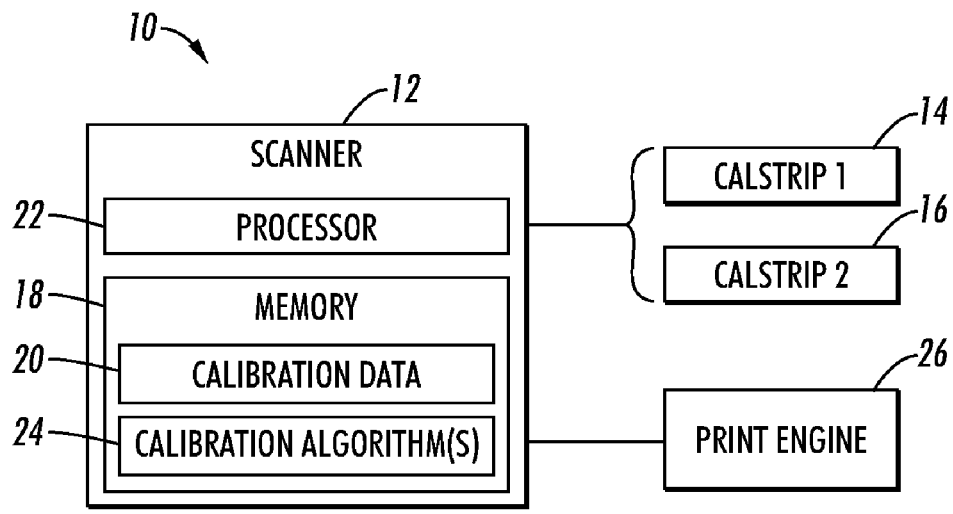
FIG. 1 illustrates a dual-pass scanner calibration system comprises a scanner that scans a first calibration strip and a second calibration strip.

With reference to FIG. 1, a dual-pass scanner calibration system 10 comprises a scanner 12 that scans a first calibration strip 14 and a second calibration strip 16. The scanner is an 8-bit scanner, according to one example. In one embodiment, the first calibration strip 14 is a light-grey calibration strip, and the second calibration strip is a darker grey calibration strip. For instance, in one example the first calibration strip has an $L^*$ value of approximately 70-90, and the second calibration strip 16 has an $L^*$ value in the range of approximately 30-50. It will be understood that $L^*$ values range from 0-100, with 0 being black and 100 being white.

The scanner 10 includes a memory 18 in which are stored calibration data generated during respective scans of the first and second calibration strips. The scanner 10 also includes a processor 22 that executes one or more calibration algorithms (e.g., computer-executable instructions) that are stored in the memory 18, in order to calibrate the scanner 10 and/or a print engine 24 (e.g., a marking system, printer, scanner, or the like) associated therewith.

According to an example, the scanner 12 scans the first calibration strip 14 and stores calibration data 20 (e.g., grey values, etc., detected during the scan of the first calibration strip. The scanner 10 then scans the second (darker) calibration strip 16 and stores similar calibration data 20 therefor. In one embodiment, the scanner scans the calibration strip 16 at 100% resolution (e.g., as though it were a $100L^*$ calibration strip) to generate high-resolution calibration data in the lower $L^*$ value region of the greyscale spectrum. The processor 22 executes one or more calibration algorithms 22 to analyze the calibration data for both the light and dark grey calibration strips to calibrate the scanner 10 and/or print engine 24. By performing the additional dark gray calibration, the system 10 effectively calibrates the scanner for grey levels at the lower end of the spectrum. That is, a typical 8-bit scanner is setup for maximum scan resolution across the whole range of greyscale inputs possible from a user. This scan resolution is accomplished by utilizing the light-grey calibration strip 14, which has a known darkness, to calibrate the scanner 10 (and/or print engine 24). By providing the second, darker calibration strip 16, it is possible to alter the calibration to provide additional measurement resolution towards the darker end of the greyscale spectrum.

Figure 2:
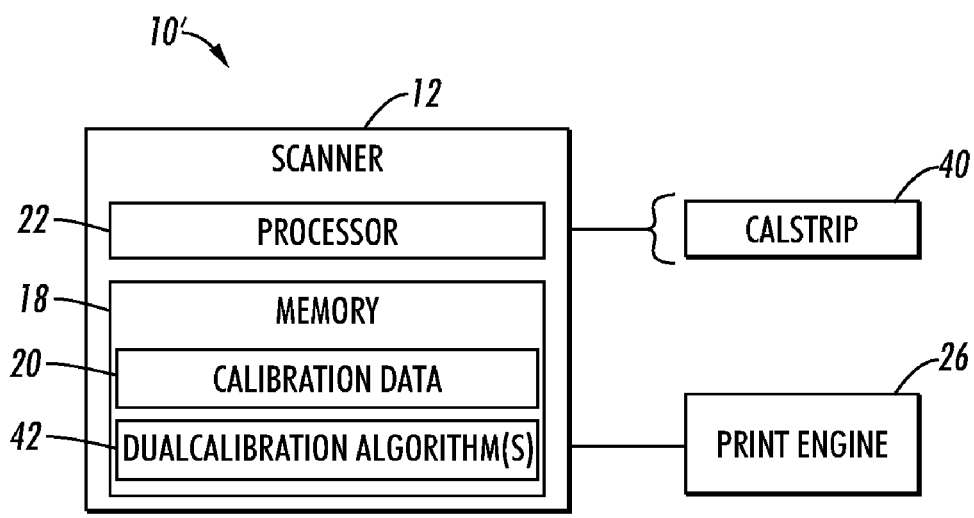
FIG. 2 illustrates a scanner calibration system in which a single calibration strip is scanned at different resolutions using a dual calibration algorithm to calibrate the scanner at both high and low $L^*$ values.

FIG. 2 illustrates a scanner calibration system 10' in which a single calibration strip 40 is scanned at different target values using a dual calibration algorithm 42 to calibrate the scanner at both high and low L* values. The system 10' comprises a scanner 12 that scans the calibration strip 40 and includes a memory 18 that stores calibration data 20 generated during the scans of the calibration strip. A processor 22 executes the dual calibration scan to scan the calibration strip 40 two times: once at a first calibration level, and again at a second calibration level. For instance, the calibration strip may have an L* value of 50. The processor directs the scanner to scan the calibration strip at 100% (e.g., to scan as though the strip has an L* value of 100) to generate two grey levels per L* step. The processor then directs the scanner to scan the strip at 50% (e.g., L*=50) to generate one grey level per L* step. It will be appreciated that the first and second scans may be performed in either order. In this manner, the scanner generates calibration data for the true L* value of the calibration strip, which is used to calibrate the scanner and/or an associated print engine 24, as well as additional, more accurate (e.g., two grey levels per L* level) information that is used to refine the calibration by improving dark level calibration.

In other embodiments, the calibration strip 40 is scanned more than two times at different calibration levels.

It will be appreciated that the memory 18 stores, and the processor 22 executes, one or more computer-executable algorithms or instructions for performing the various functions and/or providing the various features described herein. For instance, such instructions can include instructions for: scanning one or more calibration strips 14, 16 at one or more L* levels; generating calibration data 20 from the calibration strip scans; calibrating a scanner 12 and/or print engine 24 according to one or more sets of calibration data 20; etc.

In another example, the memory 18 stores and the processor 22 executes instructions for: adjusting the L* level at which a scan is performed on the static calibration strip 40; performing multiple scans of the calibration strip 40; generating multiple sets of calibration data 20 from the multiple scans; calibrating the scanner 12 and/or print engine 24 from using one or more sets of calibration data 20; etc.

Figure 3:
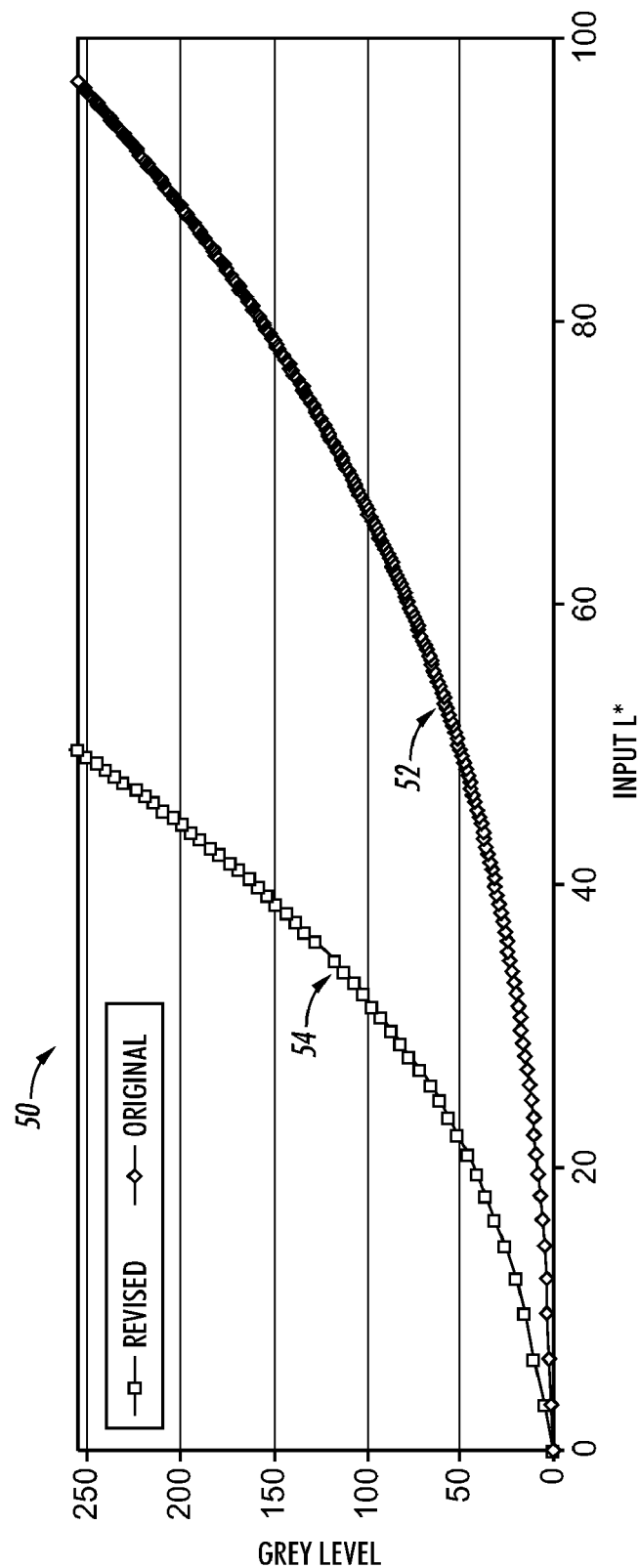
FIG. 3 shows a graph illustrating a relationship between input $L^*$ values (e.g., calibration strip $L^*$ values) and greyscale values measured during calibration.

FIG. 3 shows a graph 50 illustrating a relationship between input L* values (e.g., calibration strip L* values) and greyscale values measured during calibration. A default (diamonds) scanner calibration 52 of an 8-bit scanner, such as the calibration strip 14 of FIG. 1, and a simulated (squares) scanner calibration 54 derived from a darker calibration strip, such as the calibration strip 16 of FIG. 1. The lightest measurable input L* for the revised patch is 50 L* units (a mid-grey). As illustrated, the scanner calibration 54 for the darker calibration strip provides substantially more grey levels per L* level when L* is between 0 and 50 than is achievable using only the lighter calibration strip.

As shown in the graph 50, at approximately 20L*, a default calibration scan of the lighter calibration strip (e.g., at approximately 80L*) provides only 5 grey level units (e.g., 1 grey level per 4 L* levels), which makes it difficult to distinguish between levels of grey. By generating a second calibration data set using a second, darker (e.g., 30L*) calibration strip, approximately 50 grey levels are provided at 20L* (e.g., 2.5 grey levels per L* level), which facilitates distinguishing between grey levels in the darker end of the spectrum.

Figure 4:
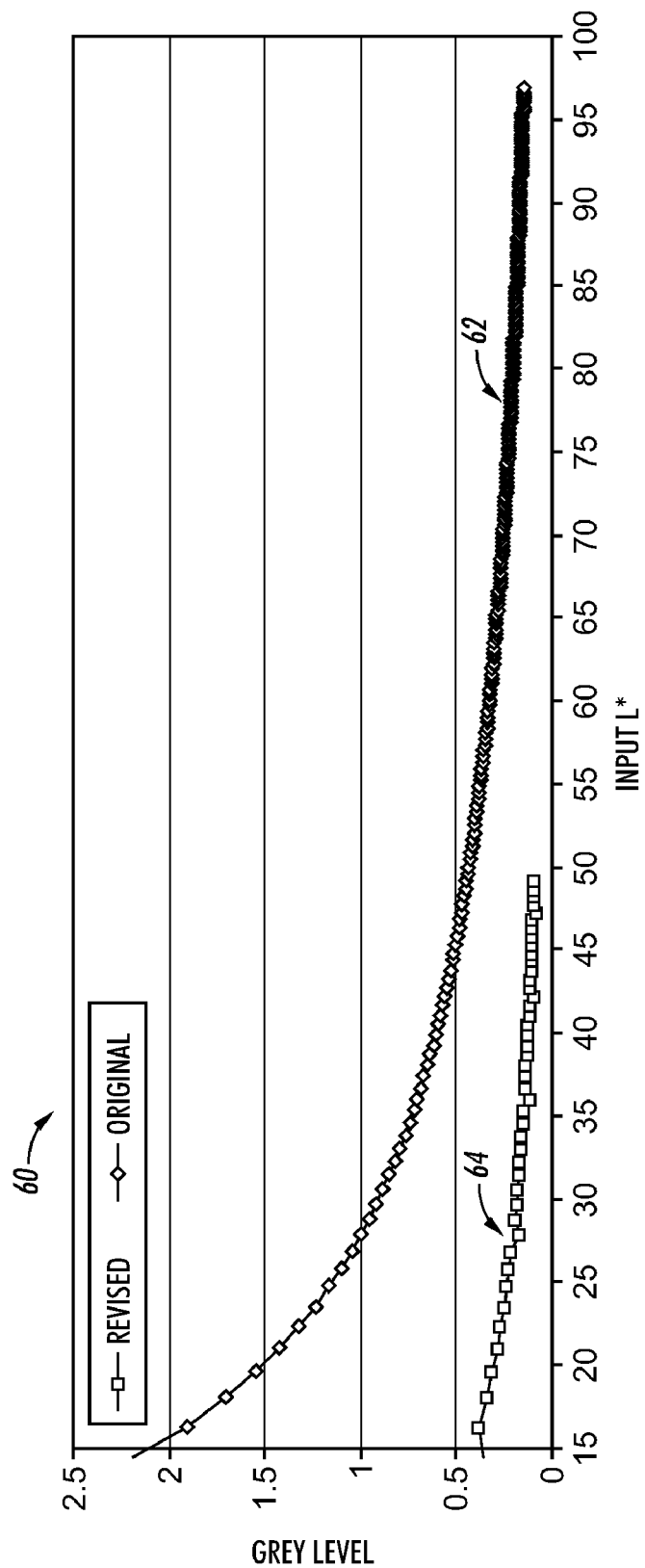
FIG. 4 illustrates a graph of a relationship between a minimum change in $L^*$ value required to alter a measured greyscale level by one unit at two different $L^*$ input levels: a lighter grey calibration level (e.g., $80L^*$) and a darker grey calibration level (e.g., $30L^*$).

FIG. 4 illustrates a graph 60 of a relationship between a minimum change in L* value required to alter a measured greyscale level by one unit at two different L* input levels: a lighter grey calibration 62 level (e.g., 80L*) and a darker grey calibration 64 level (e.g., 30L*). As shown, large changes in L* value between 0 and 50 alter the measured greyscale values for the darker calibration strip only minimally compared to the lighter calibration strip.

In one example, the first and second calibrations are performed at 80L* and at 30L* for a lighter grey (e.g., 80L*) calibration strip. At 80L* input, the measurement system gives 1 grey level for every 0.2 L* units. However, at 30L* input (on the 80L* strip), the measurement system gives 1 grey level for every 1L* unit—a relatively poor measurement resolution. By utilizing the revised darker calibration 64, it can be seen that at 30L* input, the measurement system again delivers 1 grey level for every 0.2 L* units.

Therefore, by utilizing a dual-pass system such as described with regard to FIGS. 1 and 2, once with the default calibration and once with the revised calibration, a measurement accuracy leading to a more accurate calibration routine is maintained.

Figure 5:
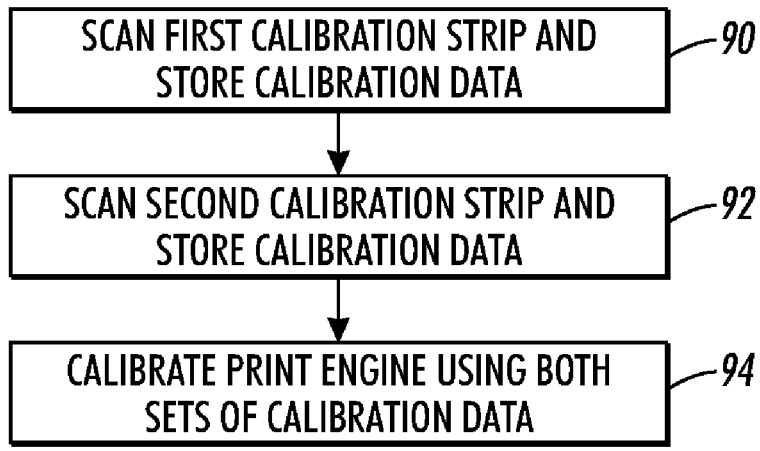
FIG. 5 is an illustration of a method for calibrating a print engine using dual calibration strips, in accordance with one or more aspects described herein.

FIG. 5 is an illustration of a method for calibrating a print engine using dual calibration strips, in accordance with one or more aspects described herein. At 90, a first calibration strip is scanned, and a first set of calibration data therefor is stored. At 92, a second calibration strip is scanned, and a second set of calibration data therefor is stored. At 94, an imaging device (e.g., a scanner, printer, print engine, marking system, etc.) is calibrated using the first and second sets of calibration data using known calibration techniques.

In one embodiment, the first calibration strip is lighter (e.g., has a higher L* value) than the second calibration strip. For instance, the first calibration strip has an L* value in the range of approximately 50-100, and the second calibration strip has an L* value of approximately 0-50. In another example, the first calibration strip has an L* value in the range of approximately 60-90, and the second calibration strip has an L* value of approximately 30-60. In another example, the first calibration strip has an L* value in the range of approximately 70-90, and the second calibration strip has an L* value of approximately 30-50. It will be appreciated that the foregoing L* value ranges are exemplary in nature and provided for illustrative purposes, and that the first and second calibration strips may be of any L* value, so long as one calibration strip is darker than the other.

According to another example, the first calibration strip has an L* value of approximately 80, and is scanned to generate the first calibration data set for calibrating a print engine. The first calibration data set yields approximately 5 grey level units for every 1 L* level at about 80 L*. However, in the darker range (e.g., approximately 30L* and lower), the first calibration data set provides only one (or fewer) grey levels per l* level. Accordingly, the second calibration strip is provided with an L* level of approximately 30. When scanned, the second calibration data set provides approximately 5 grey level units per L* unit at about 30L*. Thus, the print engine can be accurately calibrated for lower L* levels using the second calibration data set, and for higher L* levels using the first calibration data set. For instance the print engine may be calibrated for 0-50L* using the second data set, and for 50-100L* using the first data set. It will be understood that the order in which the light and dark calibration strips is reversible, such that the dark calibration strip may be scanned first, in which case the first calibration data set comprises the lower L* calibration data, and so on.

Figure 6:
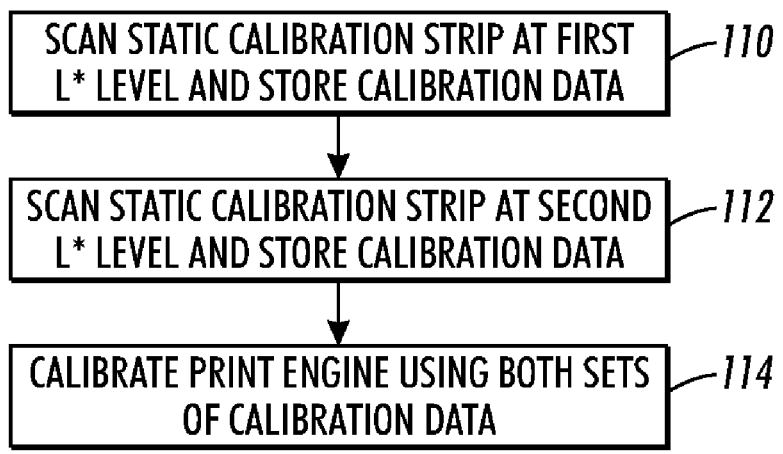
FIG. 6 illustrates a method of calibrating a print engine using dual calibration scans of a single calibration strip, in accordance with one or more aspects described herein.

FIG. 6 illustrates a method of calibrating a print engine using dual calibration scans of a single calibration strip, in accordance with one or more aspects described herein. At 110, the static calibration strip is scanned at its L* level to generate a first calibration data set comprising calibration data with approximately one grey level per L* level. For instance, if the calibration strip has an L* value of 50, then it is scanned at target value L*50, or 50% of a total scanning resolution. At 112, the calibration strip is scanned (e.g., calibrated) at 100% resolution, or target value L*100, to generate a second calibration data set with two grey levels per L* level. At 114, a print engine is calibrated using the first and second calibration data sets using known calibration techniques. For instance, higher L* levels (e.g., 30-100L*) can be calibrated using the first data set, and lower-end L* levels (e.g., 0-30L*) can be calibrated using the second calibration data set.

In another example, mid-range L* levels for the print engine can be calibrated using the first calibration data set, and end range (e.g., 0-20L* and 80-100L*) can be calibrated using the second calibration data set, which provides more detailed calibration data.

It will be understood that the first and second calibration data sets may be generated in any order. For instance, the static calibration strip can be scanned first at 100% resolution and then at the L* resolution (e.g., 50% in the above example) of the calibration strip.

It will further be appreciated that the static calibration strip L* value is not limited to 50L*, but rather may be any L* value. For instance, that L* value of the static calibration strip may be in the range of approximately 30-70L*.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of calibrating a print engine, comprising:
    scanning a first grey calibration strip to generate a first calibration data set;
    scanning a second grey calibration strip to generate a second calibration data set; and
    calibrating the print engine using the first and second calibration data sets to calibrate different portions of an L* grey spectrum;
    wherein the first grey calibration strip has an L* value in the range of approximately 50-100L*, and the second grey calibration strip has an L* value in the range of approximately 0-50L*, wherein the second grey calibration strip is less than 50L* if the first grey calibration strip is 50L*.

2. The method of claim 1, wherein the first grey calibration strip is a lighter grey than the second grey calibration strip.

3. The method of claim 1, wherein the first grey calibration strip has an L* value in the range of approximately 60-90L*, and the second grey calibration strip has an L* value in the range of approximately 30-50L*.

4. The method of claim 1, wherein the first grey calibration strip has an L* value in the range of approximately 70-90L*, and the second grey calibration strip has an L* value in the range of approximately 30-50L*.

5. The method of claim 1, further comprising electronically storing the first and second calibration data sets for use when calibrating the print engine.

6. The method of claim 1, further comprising scanning the first and second grey calibration strips using an 8-bit scanner.

7. A print engine calibration system, comprising:
    a scanner that scans a calibration strip at first and second target L* values;
    a memory that stores computer-executable instructions for scanning the calibration strip at the first and second target L* values, generating first and second calibration data sets, and calibrating the print engine using the first and second calibration data sets; and
    a processor that executes the instructions, generates the first and second calibration data sets, stores the first and second calibration sets to the memory, and calibrates the print engine using the first and second calibration data sets;
    wherein the first target L* value is in the range of approximately 50-100L*, and the second target L* value is in the range of approximately 0-50L*, wherein the second target L* value is less than 50L* if the first target L* value is 50L*.

8. The system of claim 7, wherein the scanner is an 8-bit scanner.

9. The system of claim 7, wherein the first target L* value is in the range of approximately 60-90, and the second target L* value is in the range of approximately 30-50.

10. The system of claim 7, wherein the first target L* value is in the range of approximately 70-90L*, and the second target L* value is in the range of approximately 30-50L*.

11. The system of claim 10, wherein the processor employs the first calibration data set to calibrate print engine grey levels corresponding to approximately 50-100L*.

12. The system of claim 11, wherein the processor employs the second calibration data set to calibrate print engine grey levels corresponding to approximately 0-50L*.

13. The system of claim 7, wherein the processor employs the first calibration data set to calibrate print engine grey levels corresponding to approximately 50-100L*.

14. The system of claim 13, wherein the processor employs the second calibration data set to calibrate print engine grey levels corresponding to approximately 0-50L*.

15. A method of calibrating a print engine, comprising:
    performing a first scan of a grey calibration strip at a first target value to generate a first calibration data set;
    performing a second scan of the grey calibration strip at a second target value to generate a second calibration data set; and
    calibrating the print engine using the first and second calibration data sets to calibrate different portions of an L* grey spectrum;
    wherein the grey calibration strip has an L* value in the range of approximately 40-60L*.

16. The method of claim 15, wherein the first target value is the L* value of the calibration strip, and wherein the second target value is an L* value of 100.

17. The method of claim 15, further comprising scanning the calibration strip at the first and second target values using an 8-bit scanner.

* * * * *